(12) United States Patent
Laurent

(10) Patent No.: US 11,142,200 B2
(45) Date of Patent: Oct. 12, 2021

(54) VEHICULAR ADAPTIVE CRUISE CONTROL WITH ENHANCED VEHICLE CONTROL

(71) Applicant: MAGNA ELECTRONICS INC., Auburn Hills, MI (US)

(72) Inventor: Christophe Albert Rene Laurent, Lake Orion, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 182 days.

(21) Appl. No.: 15/903,134

(22) Filed: Feb. 23, 2018

(65) Prior Publication Data

US 2018/0237011 A1 Aug. 23, 2018

Related U.S. Application Data

(60) Provisional application No. 62/462,531, filed on Feb. 23, 2017.

(51) Int. Cl.
*B60W 30/16* (2020.01)
*B60W 30/14* (2006.01)
*B60W 50/08* (2020.01)

(52) U.S. Cl.
CPC ........ *B60W 30/162* (2013.01); *B60W 30/143* (2013.01); *B60W 50/085* (2013.01); *B60W 2420/42* (2013.01); *B60W 2420/52* (2013.01)

(58) Field of Classification Search
CPC .. B60W 10/18; B60W 10/20; B60W 2420/42; B60W 2420/52; B60W 2550/30; B60W 2550/308; B60W 30/08; B60W 30/09; B60W 30/0956; B60W 30/12; B60W 30/14; B60W 30/143; B60W 30/16; B60W 30/162; B60W 30/165; B60W 50/085; B60W 50/14
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 6,587,186 | B2 | 7/2003 | Bamji et al. |
| 6,674,895 | B2 | 1/2004 | Rafii et al. |
| 6,678,039 | B2 | 1/2004 | Charbon |
| 6,690,354 | B2 | 2/2004 | Sze |

(Continued)

*Primary Examiner* — Christopher D Biagini
(74) *Attorney, Agent, or Firm* — Honigman LLP

(57) ABSTRACT

A driving assist system for a vehicle includes a sensor disposed at the equipped vehicle and having a field of sensing exterior of the equipped vehicle and forward of the equipped vehicle. A controller includes a processor operable to process data captured by the sensor. The controller, responsive at least in part to an initial speed setting of an adaptive cruise control system of the equipped vehicle, controls acceleration of the equipped vehicle. The controller, responsive at least in part to processing by the processor of data captured by the sensor, determines presence of a target vehicle ahead of the equipped vehicle and determines an acceleration profile to adjust the speed of the vehicle from the current vehicle speed to a target speed. The controller adjusts the acceleration of the equipped vehicle responsive to the acceleration profile, which has smooth transitions between the initial speed setting and the target speed.

24 Claims, 17 Drawing Sheets

(56) References Cited

U.S. PATENT DOCUMENTS

| | | | |
|---|---|---|---|
| 6,710,770 B2 | 3/2004 | Tomasi et al. | |
| 6,876,775 B2 | 4/2005 | Torunoglu | |
| 6,906,793 B2 | 6/2005 | Bamji et al. | |
| 6,919,549 B2 | 7/2005 | Bamji et al. | |
| 7,038,577 B2 | 5/2006 | Pawlicki et al. | |
| 7,053,357 B2 | 5/2006 | Schwarte | |
| 7,157,685 B2 | 1/2007 | Bamji et al. | |
| 7,176,438 B2 | 2/2007 | Bamji et al. | |
| 7,203,356 B2 | 4/2007 | Gokturk et al. | |
| 7,212,663 B2 | 5/2007 | Tomasi | |
| 7,283,213 B2 | 10/2007 | O'Connor et al. | |
| 7,310,431 B2 | 12/2007 | Gokturk et al. | |
| 7,321,111 B2 | 1/2008 | Bamji et al. | |
| 7,340,077 B2 | 3/2008 | Gokturk et al. | |
| 7,352,454 B2 | 4/2008 | Bamji et al. | |
| 7,375,803 B1 | 5/2008 | Bamji | |
| 7,379,100 B2 | 5/2008 | Gokturk et al. | |
| 7,379,163 B2 | 5/2008 | Rafii et al. | |
| 7,405,812 B1 | 7/2008 | Bamji | |
| 7,408,627 B2 | 8/2008 | Bamji et al. | |
| 7,526,103 B2 | 4/2009 | Schofield et al. | |
| 7,720,580 B2 | 5/2010 | Higgins-Luthman | |
| 7,855,755 B2 | 12/2010 | Weller et al. | |
| 8,013,780 B2 | 9/2011 | Lynam | |
| 8,027,029 B2 | 9/2011 | Lu et al. | |
| 9,036,026 B2 | 5/2015 | Dellantoni et al. | |
| 9,327,693 B2 | 5/2016 | Wolf | |
| 9,487,235 B2 | 11/2016 | Bajpai et al. | |
| 9,509,957 B2 | 11/2016 | Higgins-Luthman et al. | |
| 2003/0144784 A1* | 7/2003 | Tashiro | B60W 30/18 701/54 |
| 2009/0254260 A1 | 10/2009 | Nix et al. | |
| 2010/0179741 A1* | 7/2010 | Pelosse | B60W 30/143 701/96 |
| 2010/0245066 A1 | 9/2010 | Sarioglu et al. | |
| 2014/0005907 A1 | 1/2014 | Bajpai | |
| 2016/0214480 A1* | 7/2016 | Solyom | B60W 30/16 |
| 2017/0222311 A1 | 8/2017 | Hess et al. | |
| 2017/0254873 A1 | 9/2017 | Koravadi | |
| 2017/0276788 A1 | 9/2017 | Wodrich | |
| 2017/0277192 A1* | 9/2017 | Gupta | B60W 30/20 |
| 2017/0315231 A1 | 11/2017 | Wodrich | |
| 2017/0356994 A1 | 12/2017 | Wodrich et al. | |
| 2018/0015875 A1 | 1/2018 | May et al. | |
| 2018/0045812 A1 | 2/2018 | Hess | |
| 2018/0231635 A1 | 8/2018 | Woehlte | |
| 2019/0339382 A1 | 11/2019 | Hess et al. | |

* cited by examiner

Polynomial curves – Single Ramp Profile

- Constraints
  - Curve 1
    - $Y1(0) = V0;\quad Y1Dot(0) = D0;\quad Y1DotDot(0) = DD0$
    - $Y1(P1) = Y2(P1);\quad Y1Dot(P1) = Y2Dot(P1);\quad Y1DotDot(P1) = Y2DotDot(P1)$
  - Curve 2
    - $Y1Dot(P1) = A1;\quad Y3Dot(P2) = K*A1$
  - Curve 3
    - $Y3(P2) = Y2(P2);\quad Y3Dot(P1) = Y2Dot(P2);\quad Y3DotDot(P2) = Y2DotDot(P2)$
    - $Y3(1) = V1;\quad Y3Dot(1) = 0;\quad Y3DotDot(1) = 0$
- Curves 1&3
  - Speed: $\quad a_i x^4 + b_i x^3 + c_i x^2 + d_i x + e_i \quad$ where i = 1 or 3
  - Acceleration: $4 a_i x^3 + 3 b_i x^2 + 2 c_i x + d_i$
- Curve 2
  - Speed: $\quad a2 x^2 + b2 x + c2$
  - Acceleration: $2 a2 x + b2$

FIG. 5

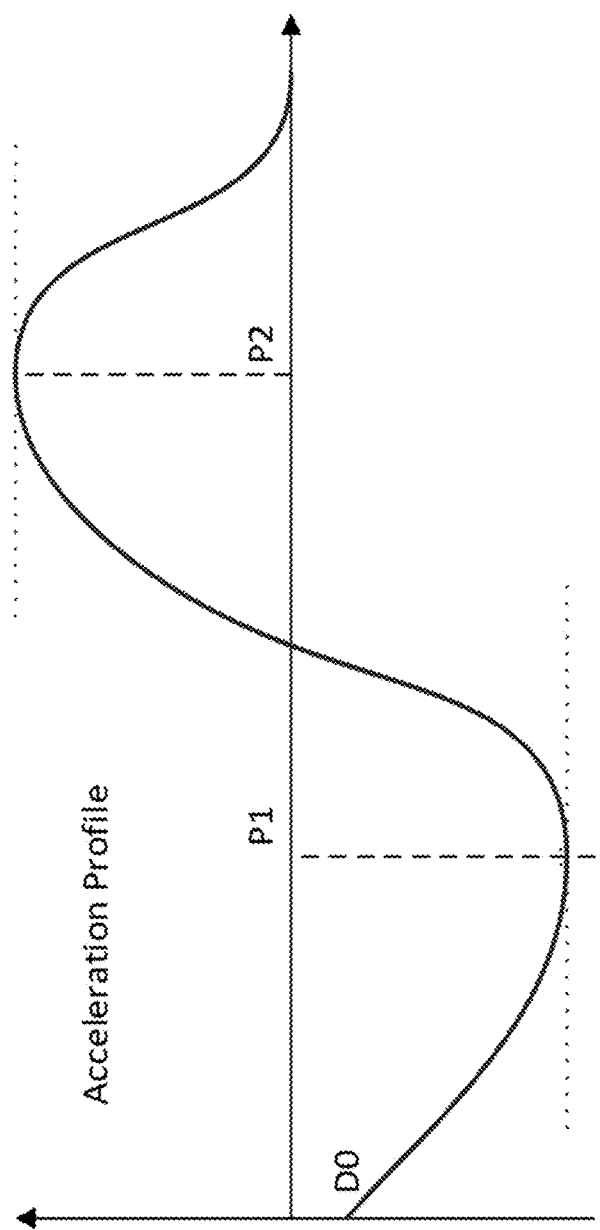

Polynomial curves – Double Ramp Profile

- Constraints
  - Curve 1
    - $Y1(0) = V0$;   $Y1Dot(0) = 0$;   [$Y1DotDot(0) = 0$ for $4^{th}$ order only]
    - $Y1(P1) = Y2(P1)$; $Y1Dot(P1) = Y2Dot(P1)$; $Y1DotDot(P1) = 0$
  - Curve 2
    - $Y2DotDot(P1) = 0$; $Y2DotDot(P2) = 0$
  - Curve 3
    - $Y3(P2) = Y2(P2)$; $Y3Dot(P1) = Y2Dot(P2)$; $Y3DotDot(P2) = 0$
    - $Y3(1) = V1$;   $Y3Dot(1) = 0$;   $Y3DotDot(1) = 0$
  - Integral of Speed profile = Distance Change (positive or negative)
- Curve 1
  - Speed:         $a1\, x^{\wedge}3 + b1\, x^{\wedge}2 + c1\, x + d1$
  - Acceleration: $3\, a1\, x^{\wedge}2 + 2\, b1\, x + c1$
- Curves 2&3
  - Speed:         $ai\, x^{\wedge}4 + bi\, x^{\wedge}3 + ci\, x^{\wedge}2 + di\, x + ei$   where $i = 2$ or $3$
  - Acceleration: $4\, ai\, x^{\wedge}3 + 3\, bi\, x^{\wedge}2 + 2\, ci\, x + di$

FIG. 9

Examples: Aggressive Speed Decrease (Single Ramp)
- Calibrations:
  - K = 0.9
  - P1 = 0.05
  - P2 = 0.30
  - D0 = -0.5
  - DD0 = -10
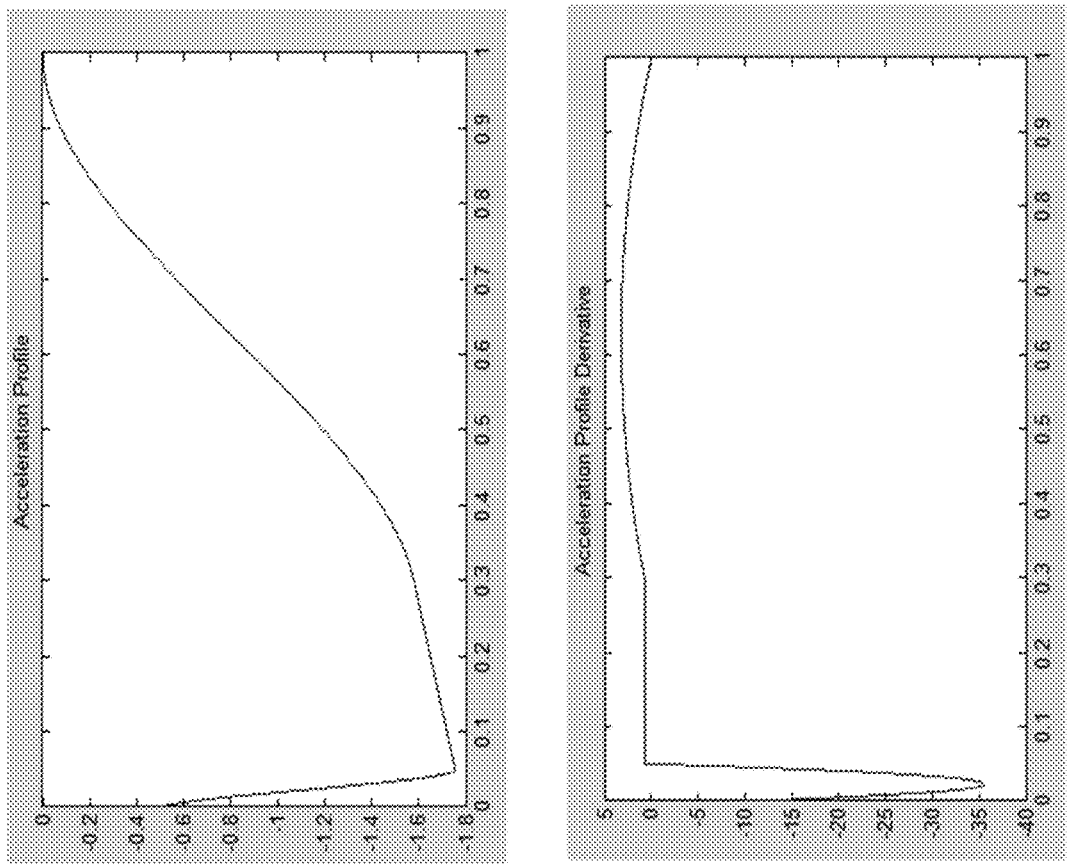
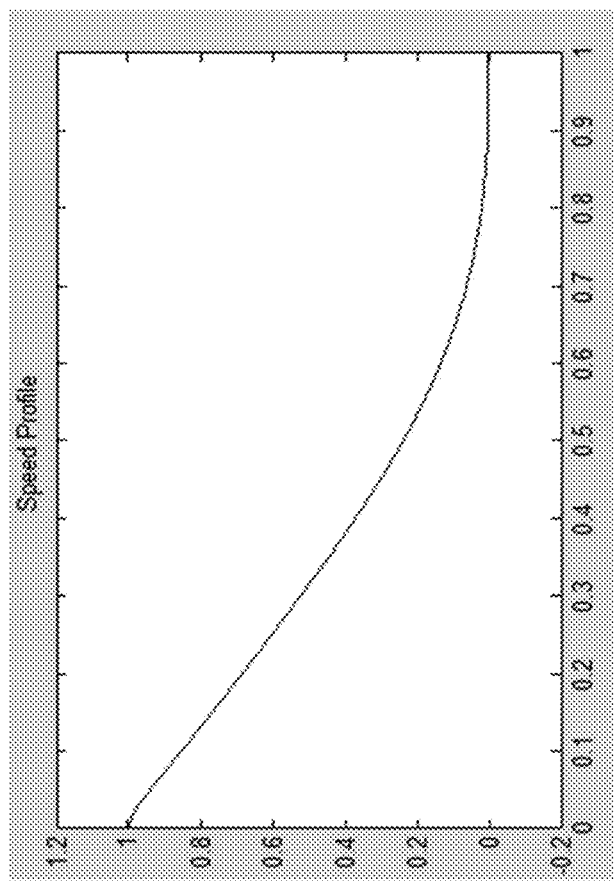
FIG. 12

Examples: Entry Phase Set as 3rd Order (Single Ramp)
- Calibrations:
  - K = 0.8
  - P1 = 0.1
  - P2 = 0.90
  - D0 = 0.0
  - DD0 = -24.2
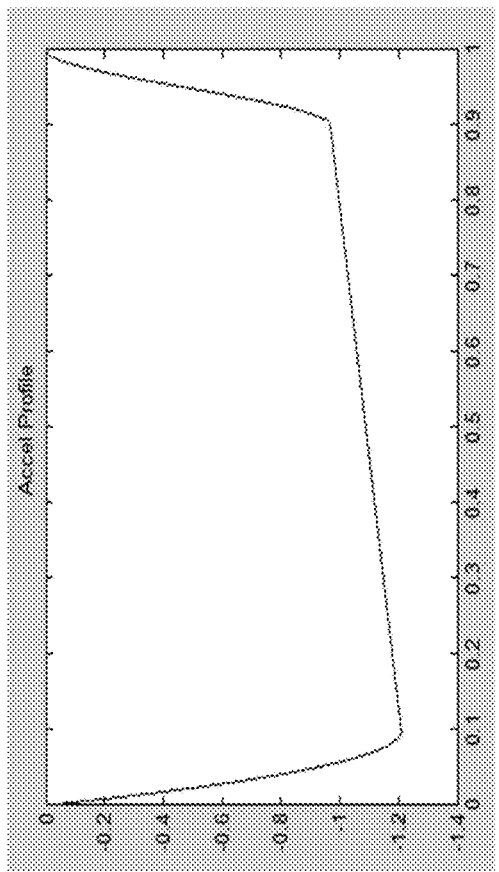
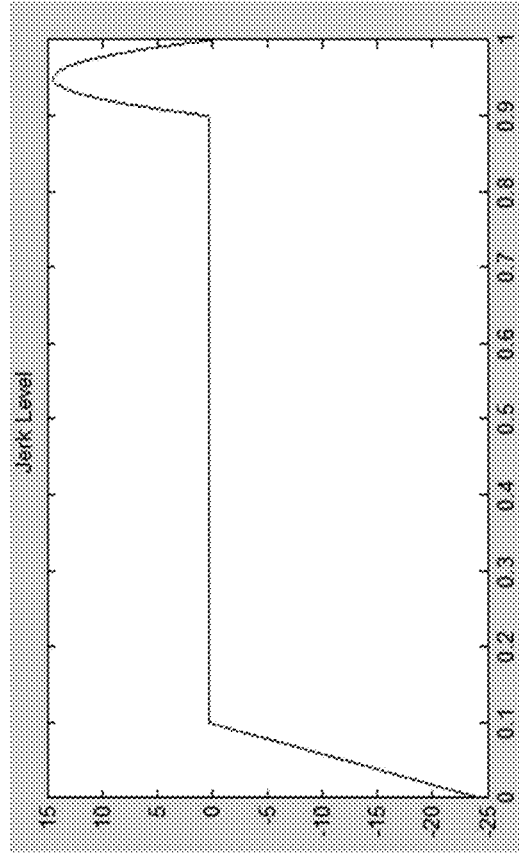
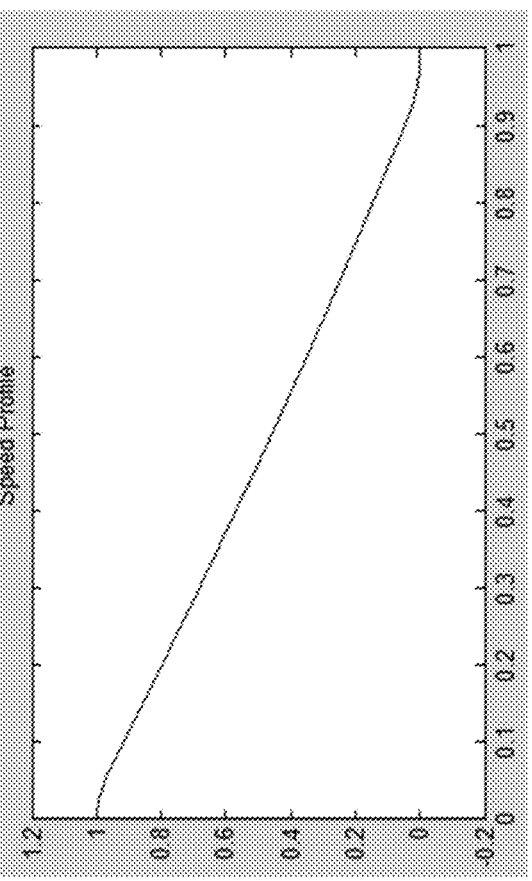
FIG. 13

Examples: Stopping Profile (Single Ramp)
- Calibrations:
  - K = 1.5
  - P1 = 0.1
  - P2 = 0.80
  - D0 = -0.2
  - DD0 = -5
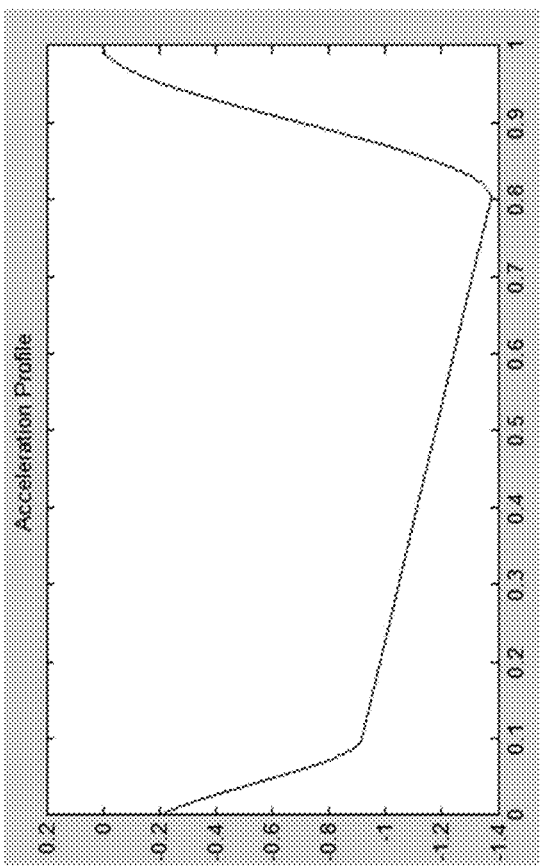
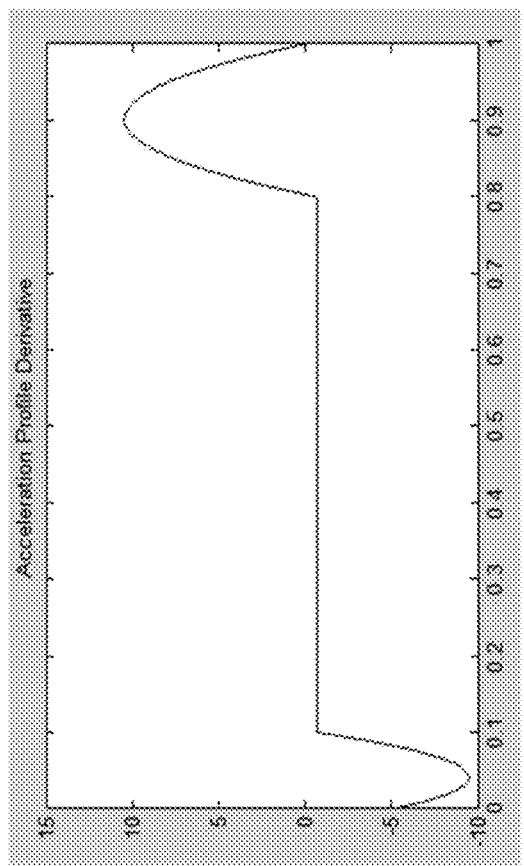
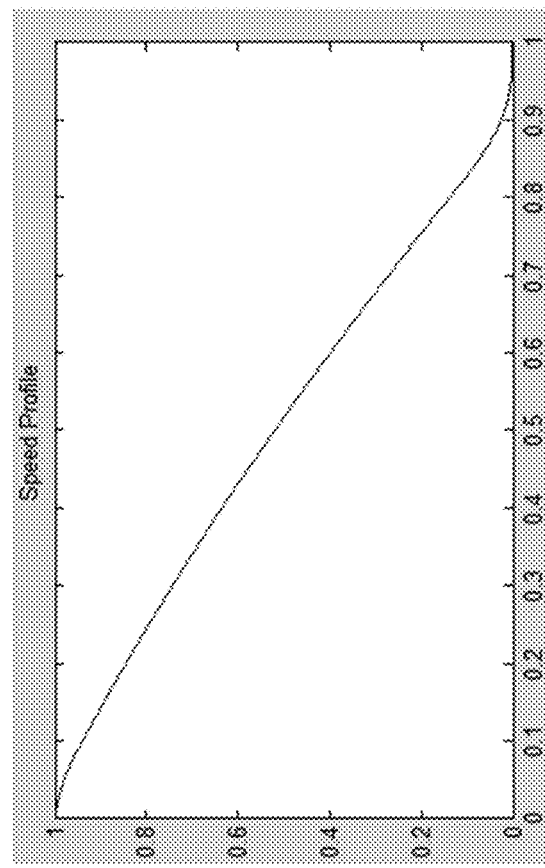
FIG. 14

Examples: Launching Profile (Single Ramp)
- Calibrations:
  - K = 0.5
  - P1 = 0.15
  - P2 = 0.65
  - D0 = 0.25
  - DD0 = 5
FIG. 15
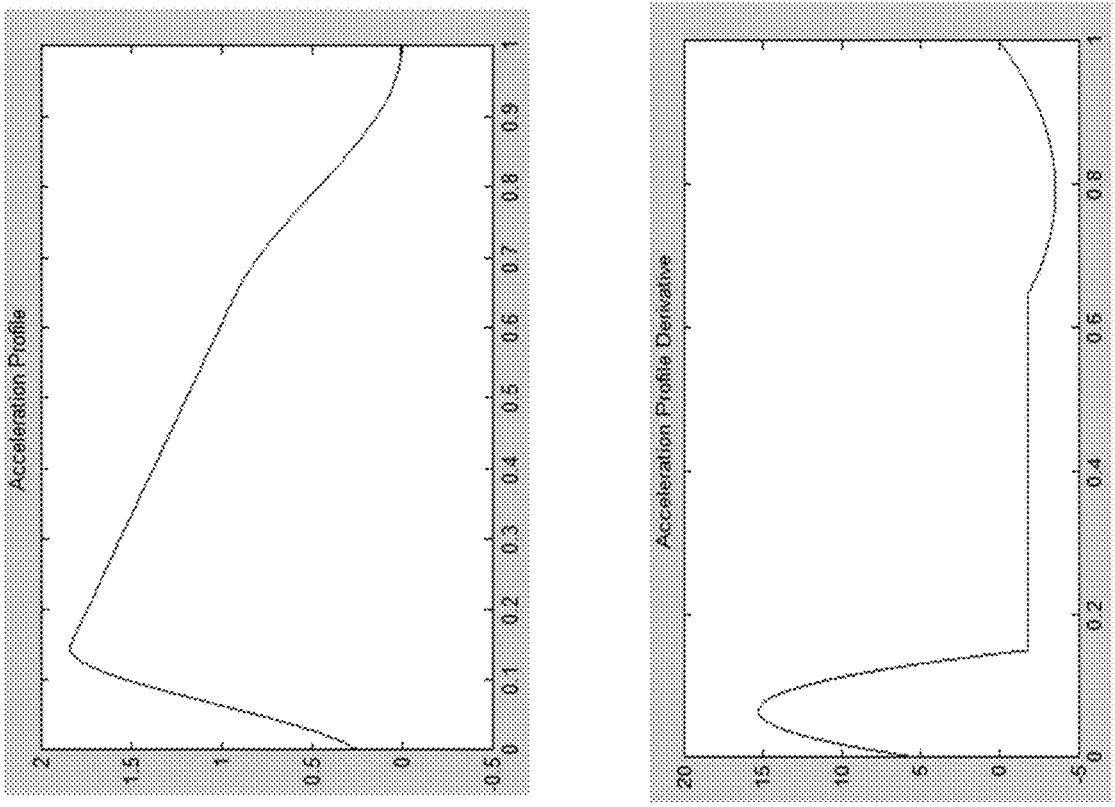
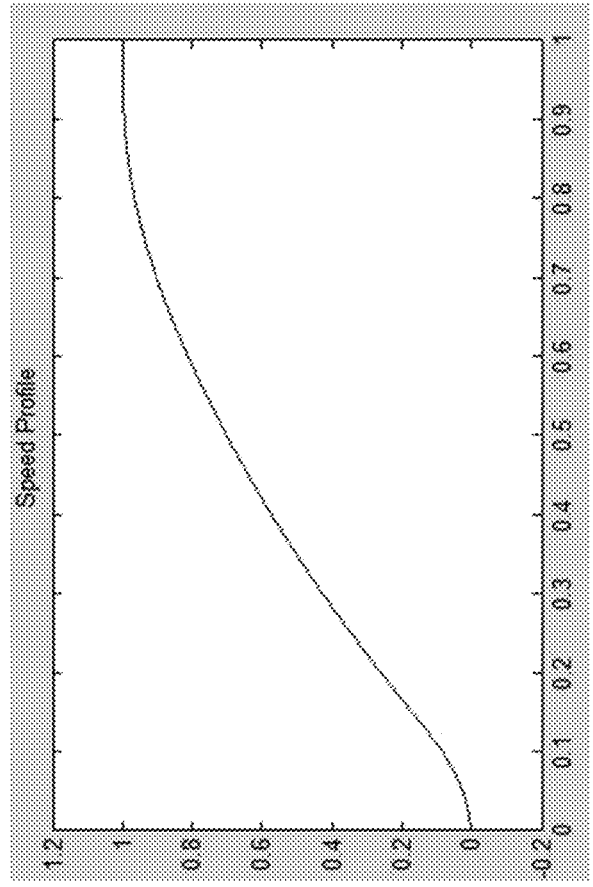

VEHICULAR ADAPTIVE CRUISE CONTROL WITH ENHANCED VEHICLE CONTROL

CROSS REFERENCE TO RELATED APPLICATION

The present application claims the filing benefits of U.S. provisional application Ser. No. 62/462,531, filed Feb. 23, 2017, which is hereby incorporated herein by reference in its entirety.

FIELD OF THE INVENTION

The present invention relates generally to a driving assist system for a vehicle and, more particularly, to a driving assist system that provides adaptive cruise control.

BACKGROUND OF THE INVENTION

Driver assist systems for vehicles are known and can provide adaptive cruise control. Examples of such known systems are described in U.S. Pat. Nos. 9,509,957; 9,327,693; 9,036,026; 8,013,780; 7,526,103 and 7,038,577, which are hereby incorporated herein by reference in their entireties.

SUMMARY OF THE INVENTION

The present invention provides a driving assist system for a vehicle that controls speed or acceleration of the vehicle in accordance with a speed setting of an adaptive cruise control (ACC), and provides adjustment of the acceleration or speed of the equipped vehicle relative to the speed setting responsive to a curved profile having smooth transitions between an initial speed setting and a target speed setting (the controlled acceleration may be an increase in acceleration or a decrease in acceleration (deceleration or negative acceleration)). The system may control acceleration according to a smooth curved acceleration profile and may control speed according to a smooth curved speed profile. The acceleration and speed profiles are determined responsive to a change in control mode of the system (such as between a speed mode, where the system controls the vehicle according to a speed setting, and a distance mode, where the system controls the vehicle to maintain a predetermined distance between the equipped vehicle and a vehicle ahead of the equipped vehicle). The system is responsive to processing of data sensed by a sensor that senses exterior of the vehicle (such as an image-based sensor or camera, a lidar sensor or a radar sensor or the like).

These and other objects, advantages, purposes and features of the present invention will become apparent upon review of the following specification in conjunction with the drawings.

BRIEF DESCRIPTION OF THE DRAWINGS

FIG. 5 shows polynomial curve constraints for a single ramp profile;

FIG. 8 shows a graph of a double ramp profile with curved transitions;

FIG. 9 shows polynomial curve constraints for a double ramp profile;

FIGS. 11-16 show exemplary single ramp profiles for speed increases and decreases and stopping and launching.

DESCRIPTION OF THE PREFERRED EMBODIMENTS

A vehicle vision system and/or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
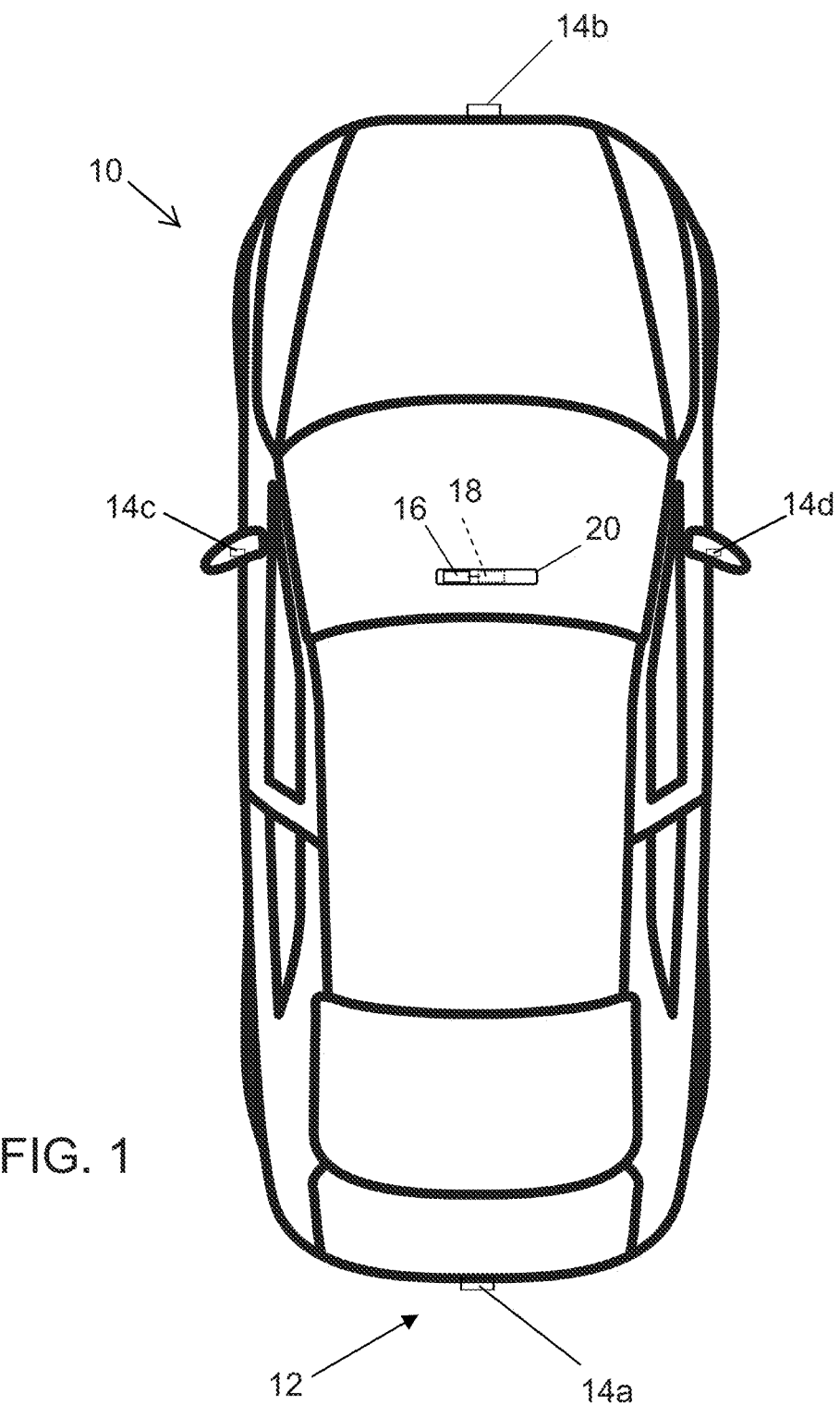
FIG. 1 is a plan view of a vehicle with a sensing system that incorporates cameras and/or other sensors in accordance with the present invention.

Referring now to the drawings and the illustrative embodiments depicted therein, a vehicle 10 includes an imaging system or vision system 12 that includes at least one exterior viewing imaging sensor or camera (or non-imaging sensor, such as a lidar sensor or radar sensor or the like), such as a rearward viewing imaging sensor or camera 14a (and the system may optionally include multiple exterior viewing imaging sensors or cameras (or non-imaging sensor, such as a lidar sensor or radar sensor or the like), such as a forward viewing camera or sensor 14b at the front (or at the windshield) of the vehicle, and a sideward/rearward viewing camera or sensor 14c, 14d at respective sides of the vehicle), which captures images exterior of the vehicle, with the camera(s) having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). Optionally, one or more non-imaging sensors (such as a lidar sensor or radar sensor or the like) may be disposed at the vehicle to sense at least forward of the vehicle (such as for object, vehicle and/or pedestrian detection, collision avoidance, and/or the like). The vision system 12 includes a control or controller or electronic control unit (ECU) or processor 18 that is operable to process image data captured by the camera or cameras (or sensors) and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera(s) or sensor(s) to the ECU may comprise any suitable data or communication link, such as a vehicle network bus or the like of the equipped vehicle.

Figure 1A:
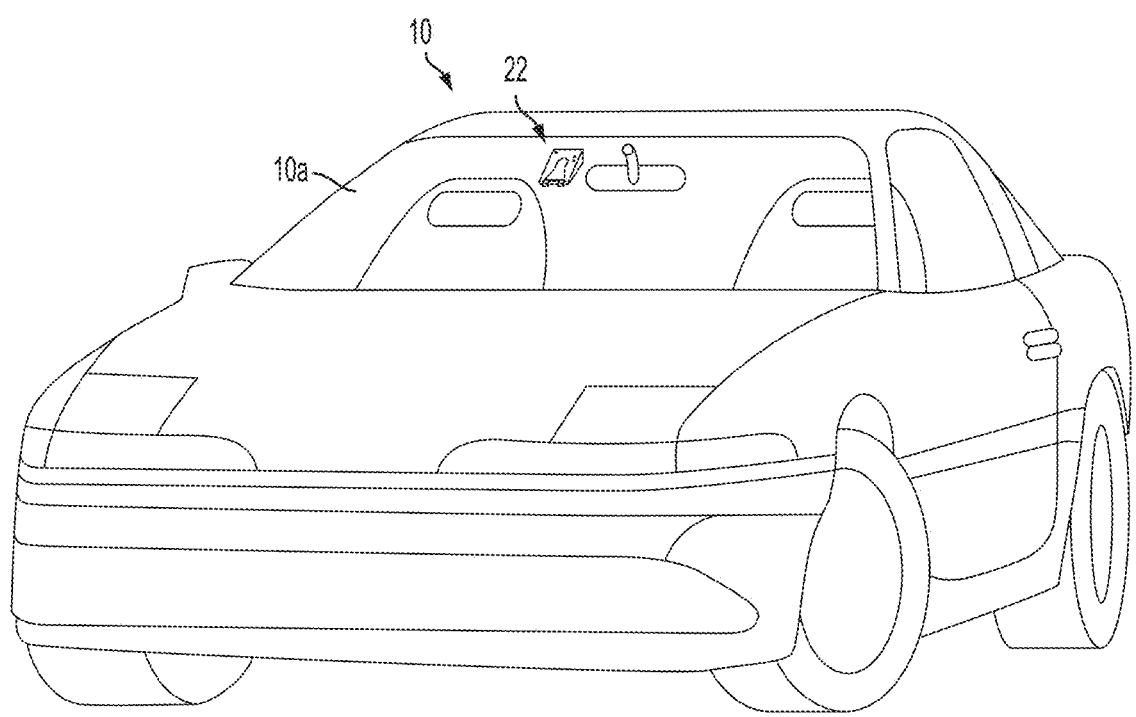
FIG. 1A is a perspective view of a vehicle with a forward viewing camera for use with the driving assist system of the present invention.

Optionally, the system may have a windshield-mounted camera that views forward through the windshield and ahead of the vehicle, and the vehicle may include one or more other exterior viewing cameras (as described above) and/or one or more radar sensors or lidar sensors or the like for sensing at least partially around the vehicle. For example, and with reference to FIG. 1A, the vehicle 10 may include a windshield-mounted forward facing camera 22 disposed at the windshield 10a of the vehicle so as to view forwardly through the windshield of the vehicle and ahead of the vehicle. The camera 22 has a forward field of view that encompasses the road ahead of the vehicle and sideward of the lane in which the vehicle is traveling. Image data captured by the camera 22 is processed (such as via the ECU and/or processor 18) to detect, for example, vehicles ahead of the equipped vehicle, lane markers on the road, traffic signs, pedestrians and/or the like. The camera 22 is part of an adaptive cruise control system of the vehicle that is operable to maintain a selected travel speed of the vehicle and to adjust the speed (via accelerating or braking) responsive at least in part to detection of other vehicles and/or pedestrians ahead of the vehicle and/or the like. Optionally, the sensor of the system may comprise any suitable forward sensing sensor (disposed behind the windshield or at a forward portion of the vehicle), where sensor data sensed by the sensor is processed for use in determining the acceleration profile and controlling vehicle acceleration when the adaptive cruise control changes from one speed setting or target speed to another speed setting or target speed.

The system of the present invention provides a method for profiling the desired speed and desired acceleration for the vehicle in which the system is installed during a change of target speed for the adaptive cruise control. The acceleration profile is the derivative curve of the speed profile. The system of the present invention assures the continuity of the desired vehicle acceleration. The system also provides a feed-forward acceleration during the transition phase to be used as an open loop command. The feed-forward acceleration functions to accomplish the change in the host vehicle speed. The speed profile is used to provide a correction to ensure the vehicle speed matches the desired vehicle speed during the transition phase.

The driving assist system includes a longitudinal control logic that, once activated, controls the speed of the host vehicle when no relevant vehicle is in the path of the host vehicle ("speed mode"). In case a vehicle is determined to be in the path of the host vehicle, the longitudinal control shall control the desired distance ("distance mode") between the host vehicle and the determined vehicle present in the host vehicle path. In a distance mode, the host vehicle speed could be lower than the cruise control set speed that is set by the driver of the host vehicle.

In a Full Speed Range Adaptive Cruise Control configuration, the longitudinal control shall follow a vehicle in its path until complete stop and resume driving (or at least allow resuming) once the preceding vehicle moves away. It also has the possibility of automatically coming to a complete stop responsive to determination of a stop sign, a stopped vehicle or a traffic sign in the host vehicle path that requires the vehicle to stop.

The purpose of the longitudinal control transition profiles is to provide a smooth transition between two different set speeds or two different control modes. A change in control mode would be triggered if a slower vehicle comes in the path of the host vehicle forcing the longitudinal control logic to switch to the distance mode and to control the distance between the host and the slower vehicle instead of just controlling the host vehicle speed.

Below is a list of exemplary control mode changes that would trigger the usage of transition profiles:

Speed mode to distance mode (slower vehicle in the path of the host vehicle);

Distance mode to speed mode (vehicle in the host vehicle path moved away);

Driver resuming longitudinal control from a different speed than the set speed;

Resuming either speed or distance modes after the driver has overridden the longitudinal control logic (such as when the driver may press the accelerator pedal while the vehicle is being controlled in either the speed mode or distance mode, such as if the driver wants to pass a vehicle traveling slower ahead of the equipped vehicle);

Host vehicle automatically coming down to a stop sign or traffic light with no vehicle in path (Full Speed Range ACC); and Host vehicle resuming driving after a stop with no vehicle in path (Full Speed Range ACC).

The system of the present invention provides a smooth transition upon a change of desired set speed for a longitudinal control algorithm. Polynomial curves are used to profile the reference signals during the transition phase. Calibration parameters are provided to change some of characteristic of the profiles. The profiles are normalized values.

Upon longitudinal control mode transitions, the desired acceleration and desired set speed are profiled. For example, the system may profile the desired acceleration for the host vehicle instead of stepping it, or the system may profile the desired set speed for the host vehicle instead of stepping it. The system thus may provide a smaller manageable error for the longitudinal controller to deal with.

The profiled desired acceleration is determined responsive to the controller feedforward term that is used as a proactive command needed for the transition. The speed profile is used to provide a reference of the expected host vehicle speed during each steps of the transition. The speed reference is then compared with the actual host vehicle to generate an error that is fed into a PID controller. The acceleration profile is the derivative of the speed profile.

Figure 3:
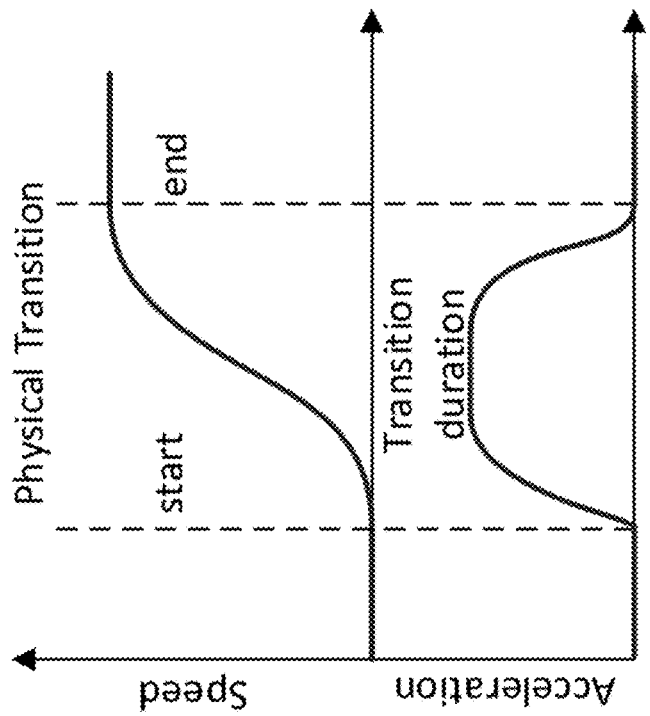
FIG. 3 shows graphs of converted ramps with curved transitions for acceleration and speed in accordance with the present invention.
Figure 2:
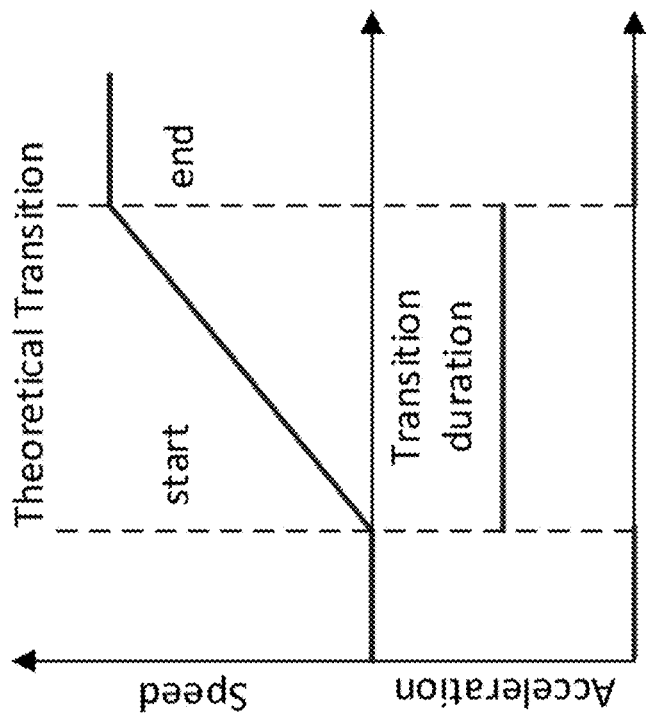
FIG. 2 shows graphs of linear single ramp profiles for acceleration and speed of a vehicle.

As shown in FIGS. 2 and 3, a single ramp profile is used to ramp host vehicle speed from a previous value to the new value. The system may convert a linear ramp (FIG. 2) from an initial speed to a final speed into a curve with continuous first and second derivate curves (FIG. 3).

Figure 4:
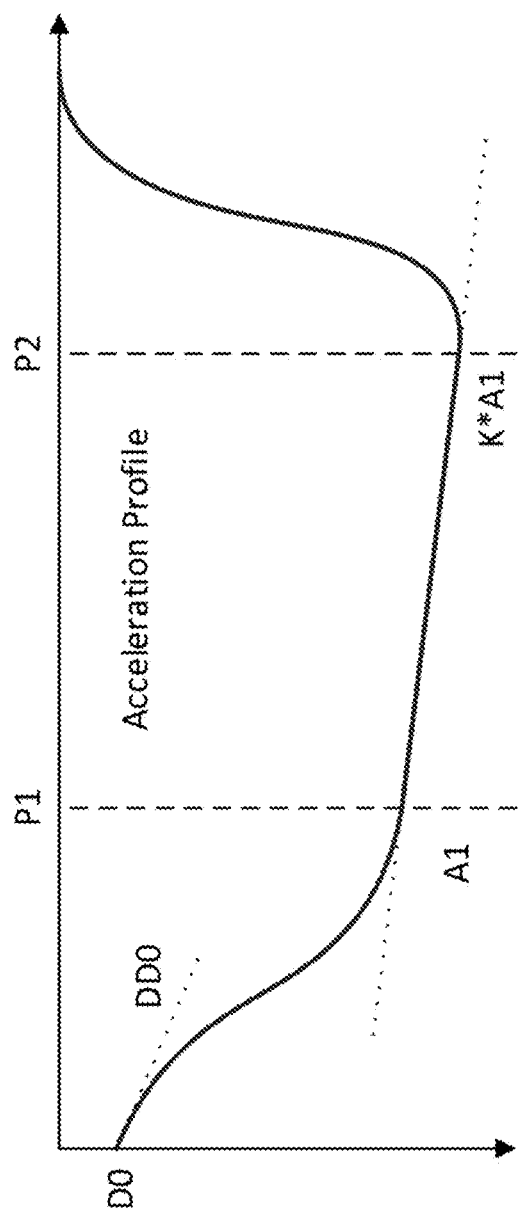
FIG. 4 shows a graph of a single ramp profile with curved transitions.
Figure 7:
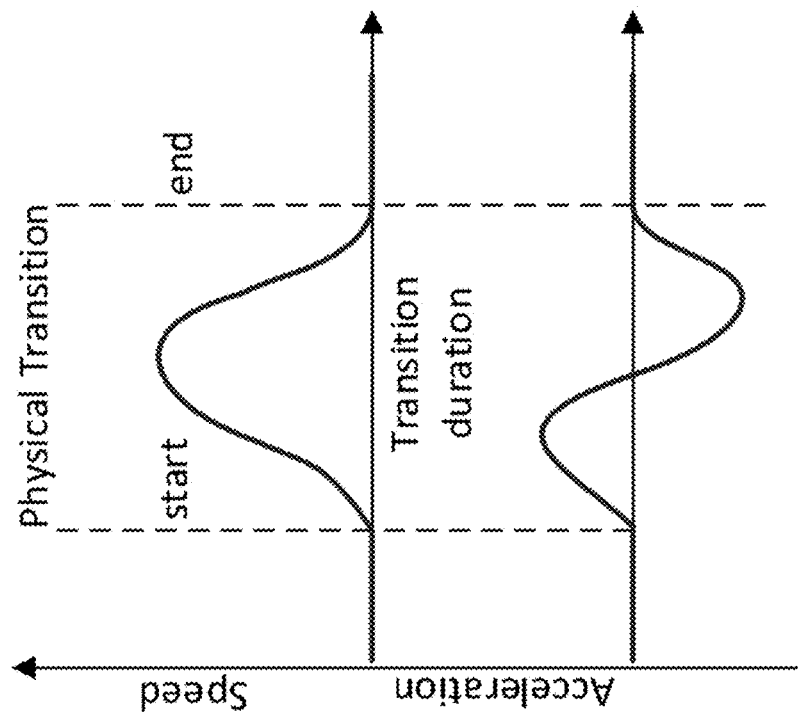
FIG. 7 shows graphs of converted double ramp profiles with curved transitions for acceleration and speed in accordance with the present invention.
Figure 6:
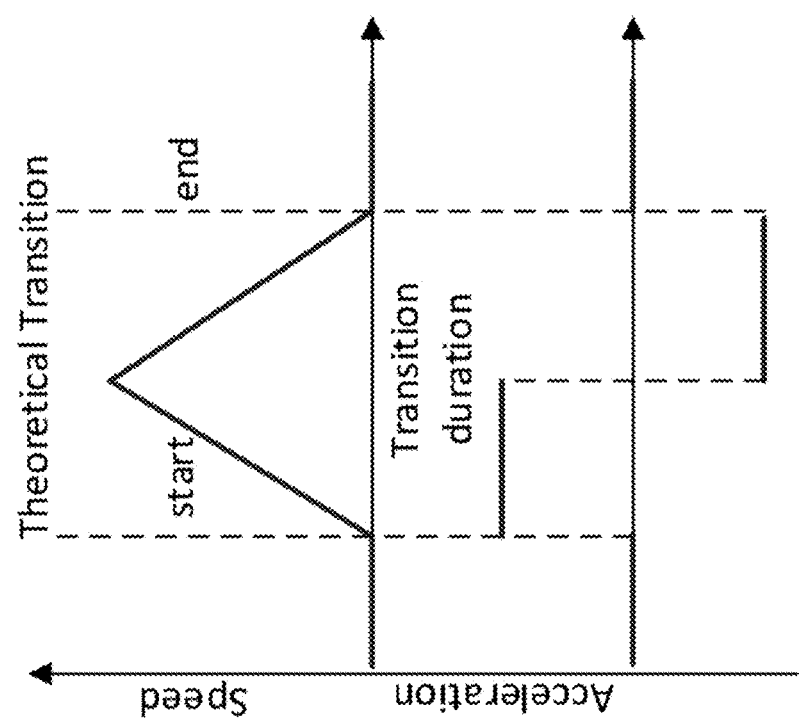
FIG. 6 shows graphs of linear double ramp profiles for acceleration and speed of a vehicle.

With reference to FIGS. 4 and 5, the initial acceleration (DO) and its derivative (DDO) are parameters that can be used to feed the actual vehicle values or to initiate a stronger change. The profile comprises three sections. At an entry phase, the system brings the desired acceleration to the acceleration level of the main phase. The system may utilize a 4th order polynomial on speed (3rd order polynomial for acceleration), or may use a 3rd order polynomial instead with initial acceleration derivative. The profile may be initialized with the actual acceleration or with some desired acceleration step.

At the main phase, there is an acceleration plateau (K=1) or linear change (with K!=1). The profile may use a 2nd order polynomial on speed (linear curve for acceleration).

At the exit phase, the system brings the acceleration to zero to reach the target speed with zero jerk. The profile may use a 4th order polynomial on speed (3rd order polynomial for acceleration).

As shown in FIGS. 6-9, the system may provide a double ramp profile concept, which increases or decreases the time gap between the host and target vehicles when travelling at similar speeds. The system may convert a double ramp on speed into a curve with continuous 1st and 2nd derivative curves. The initial acceleration (DO) is a parameter that can be used to feed the actual vehicle value or to initiate a stronger change.

The profile comprises three sections. At an entry phase, the system may initiate a speed change (either increase or decrease), and may use a 3rd order polynomial on speed (2nd order polynomial for acceleration), or may instead use a 4th order polynomial on speed with the initial acceleration derivative set to zero. At the main phase, the system may turn the speed around, and may use a 4th order polynomial on speed (3rd order polynomial for acceleration). At the exit phase, the system may bring the acceleration to zero to reach the targeted relative distance with zero jerk, and may use a 4th order polynomial on speed (3rd order polynomial for acceleration).

Figure 10:
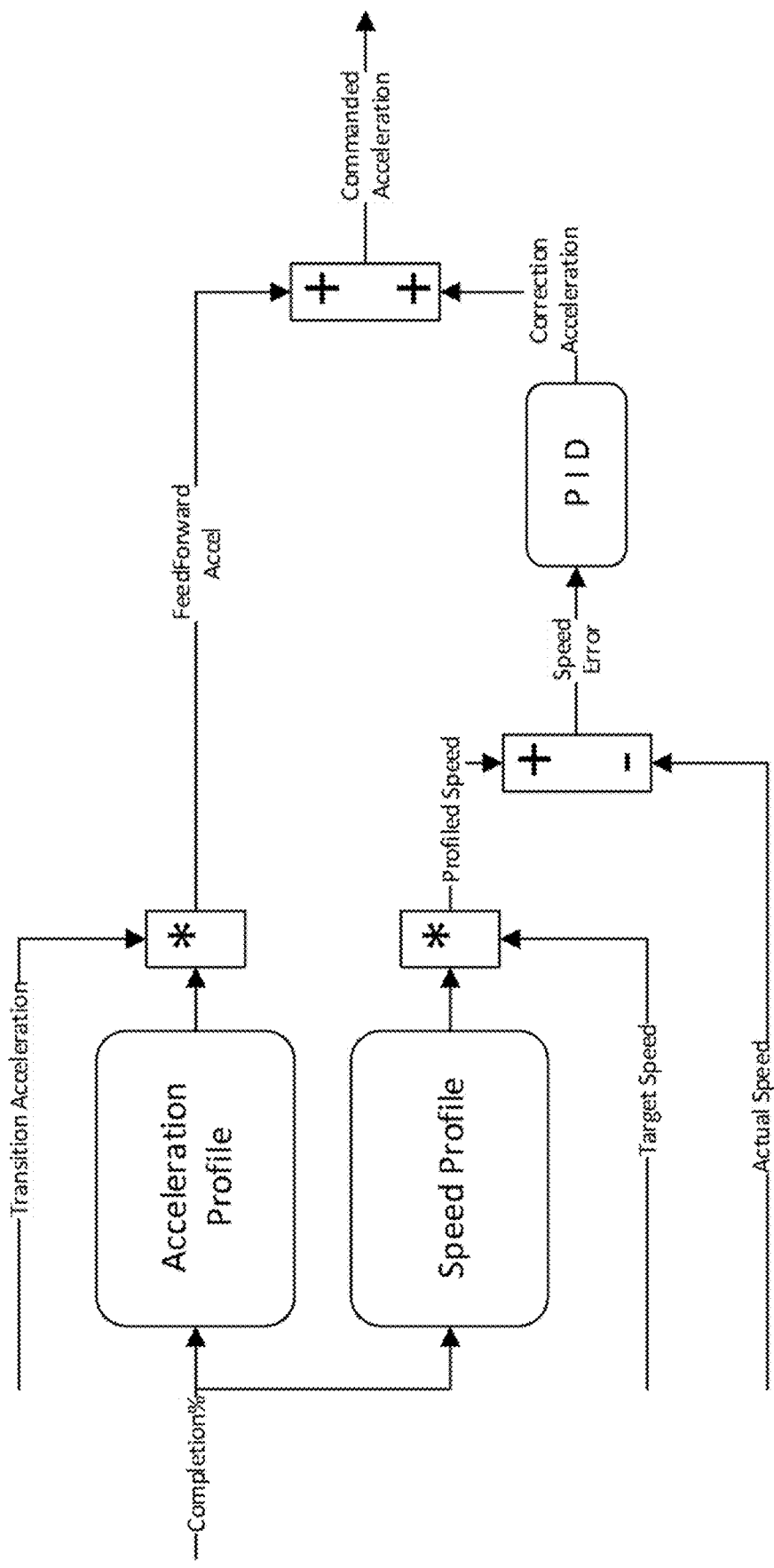
FIG. 10 is a control diagram for the system of the present invention.
Figure 11:
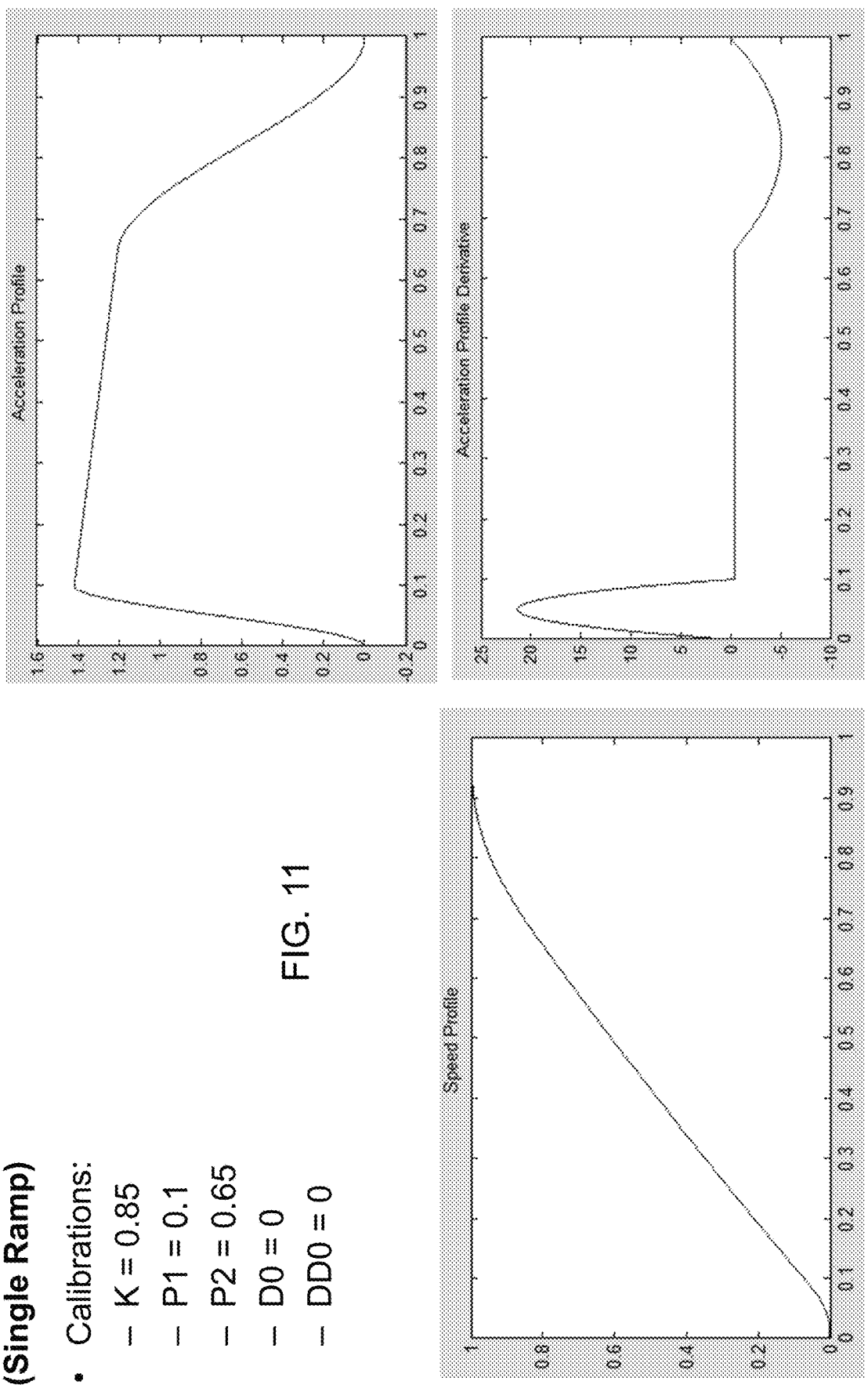
Figure 16:
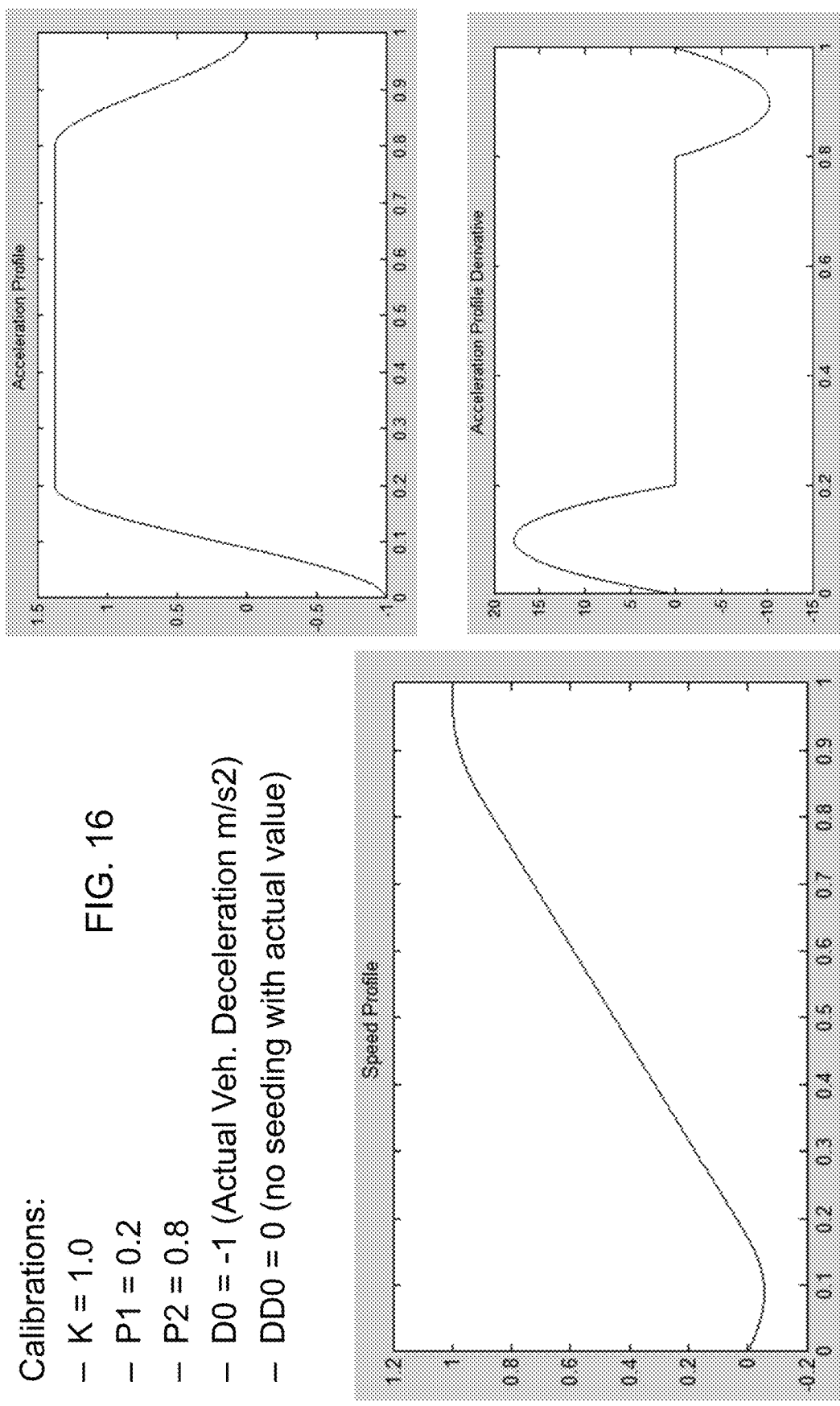
Figure 17:
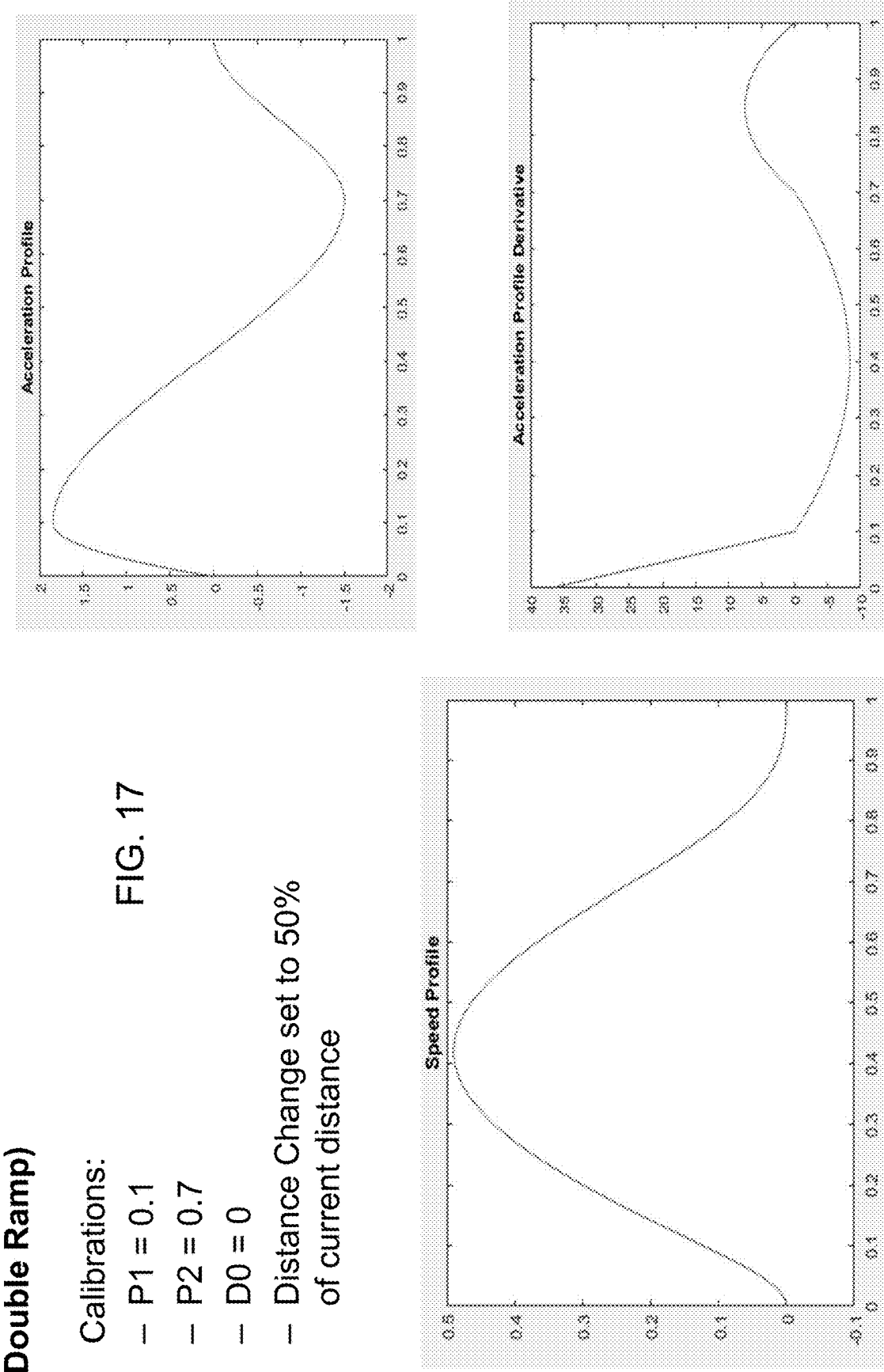
FIGS. 17 and 18 show exemplary double ramp profiles for relative distance increases and decreases.
Figure 18:
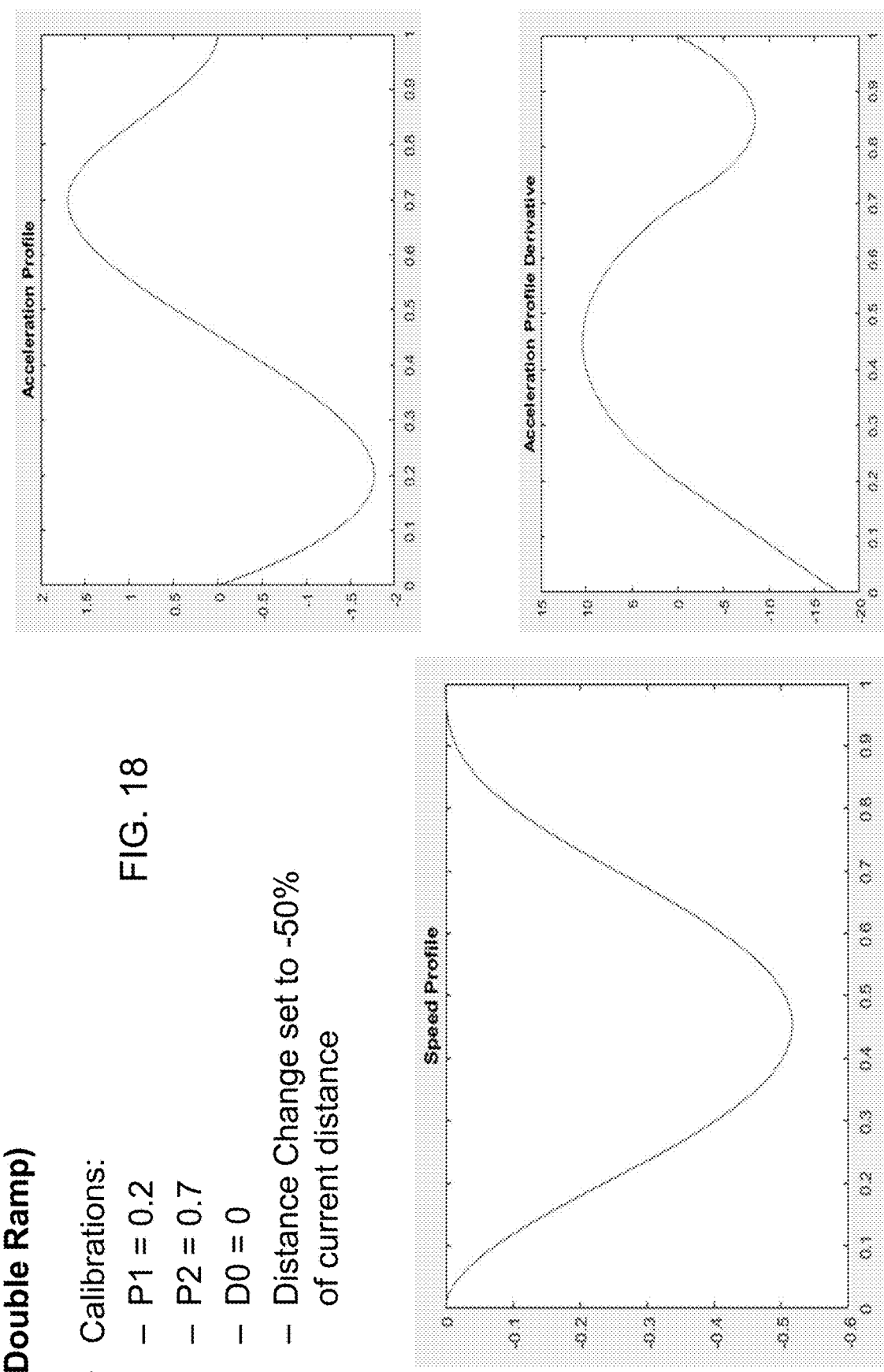

A control diagram for the system is shown in FIG. 10. The diagram combines the feed forward and PID control to provide the desired or corrected or commanded acceleration of the vehicle.

The control diagram determines the acceleration profile and speed profile responsive to a completion percentage. In the speed control mode, the Completion %=Max (Time Based %, Speed Progress %, LastCompletion %), with calibration being a transition phase time duration. A rectangular profile is triggered by a set speed change and entering the speed control mode (such as when a target vehicle moves out of the path of the host or equipped vehicle). In the distance control mode, the Completion %=Max (Time Based %, Distance Progress %, LastCompletion %), with calibration being a transition phase time duration. The profile is triggered by a distance selection change using the double ramp profile and entering the distance control mode (such as when a target vehicle is determined in the path of the host or equipped vehicle or when another vehicle cuts in front of the host or equipped vehicle) using the rectangular profile. In the stopping control mode, the system operates similar to how it operates in the distance control mode, except distance progress is distance to the place where the subject vehicle needs to stop (instead of the determined distance between two vehicles).

The transition acceleration is calculated upon starting the profile. For example, in the speed control mode, the Acceleration=(Target Speed−Actual Speed)/Transition Time. Optionally, the system may use a percentage of vehicle power available. In the distance control mode, the system may use a single ramp profile, where Acceleration=(Relative Speed/Distance Error)*Target Vehicle Speed. In the distance control mode, the system may use a double ramp profile, where the normalized distance change is the integral of the speed profile. In the stopping control mode, the transition acceleration is determined from calibration desired stopping acceleration (per SRD).

With reference to FIGS. 11-18, examples of profiles are shown for speed increases (FIG. 11), aggressive speed decrease (FIG. 12), entry phase set as a third order (FIG. 13), stopping profile (FIG. 14), launching profile (FIG. 15), and speed increase for a decelerating vehicle (FIG. 16) using a single ramp. Also, examples of profiles are shown for relative distance increases (FIG. 17) and relative distance decreases (FIG. 18) using a double ramp.

Although shown and described as a system for an adaptive cruise control system (where a driver of the vehicle sets a speed of the vehicle and the adaptive cruise control system adjusts the speed of the vehicle), the system of the present invention may be suitable for use in autonomous vehicle control systems (that, in addition to controlling the speed of the vehicle, also control the steering of the vehicle, responsive to a plurality of sensors disposed at the vehicle).

For autonomous vehicles suitable for deployment with the system of the present invention, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically, an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

As discussed above, the driving assist system may determine the presence of the target vehicle ahead of the equipped vehicle via processing of data captured by a forward sensing sensor of the vehicle. The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

The system may utilize sensors, such as radar or lidar sensors or the like. The sensing system may utilize aspects of the systems described in U.S. Pat. Nos. 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0015875; US-2017-0356994; US-2017-0315231; US-2017-0276788; US-2017-0254873; US-2017-0222311 and/or US-2010-0245066, and/or U.S. patent application Ser. No. 15/675,919, filed Aug. 14, 2017, now U.S. Pat. No. 10,641,867, and/or Ser. No. 15/897,268, filed Feb. 15, 2018, now U.S. Pat. No. 10,782,388, which are all hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A driving assist system for a vehicle, said driving assist system comprising:

a camera disposed at a vehicle equipped with said driving assist system and having a field of view exterior of the equipped vehicle and forward of the equipped vehicle;

a controller comprising a processor operable to process image data captured by said camera;

wherein said controller controls acceleration of the equipped vehicle at least in part in accordance with a speed setting of an adaptive cruise control system of the equipped vehicle;

wherein said controller, responsive at least in part to processing by said processor of image data captured by said camera, determines presence of a lead vehicle ahead of the equipped vehicle and in the same traffic lane traveled by the equipped vehicle;

wherein said controller, responsive to determination of the presence of the lead vehicle ahead of the equipped vehicle, determines a target speed for the equipped vehicle;

wherein said controller determines an acceleration profile to adjust the speed of the equipped vehicle to the target speed;

wherein the determined acceleration profile comprises an entry phase, a main phase, and an exit phase;

wherein the entry phase comprises a first function represented by a second order polynomial curve, the main phase comprises a second function represented by a third order polynomial curve, and the exit phase comprises a third function represented by a third order polynomial curve;

wherein said controller adjusts acceleration of the equipped vehicle based on an output of the first function, an output of the second function, or an output of the third function of the determined acceleration profile, and wherein the phases, when combined, provide a non-linear transition to the target speed; and wherein the entry phase of the determined acceleration profile initiates a speed change of the equipped vehicle, and wherein the main phase of the determined acceleration profile changes a direction of the acceleration of the equipped vehicle, and wherein the exit phase of the determined acceleration profile brings the acceleration of the equipped vehicle to zero.

2. The driving assist system of claim 1, wherein said controller operates in a speed mode to control the speed of the equipped vehicle in accordance with the speed setting when no relevant vehicle is in the path of travel of the equipped vehicle.

3. The driving assist system of claim 2, wherein, responsive to determination of the lead vehicle in the path of travel of the equipped vehicle and in the same traffic lane traveled by the equipped vehicle, said controller operates in a distance mode to control the equipped vehicle to maintain a predetermined distance between the equipped vehicle and the determined lead vehicle.

4. The driving assist system of claim 3, wherein said controller determines an acceleration profile to control the equipped vehicle to provide a smooth transition when said controller switches between the speed mode and the distance mode.

5. The driving assist system of claim 3, wherein said controller adjusts acceleration of the equipped vehicle based at least in part on the determined acceleration profile responsive to a change from the speed mode to the distance mode.

6. The driving assist system of claim 3, wherein said controller adjusts acceleration of the equipped vehicle based at least in part on the determined acceleration profile responsive to a change from the distance mode to the speed mode.

7. The driving assist system of claim 3, wherein said controller adjusts acceleration of the equipped vehicle based at least in part on the determined acceleration profile responsive to resuming the speed mode or the distance mode after a driver of the equipped vehicle has temporarily overridden control of the equipped vehicle.

8. The driving assist system of claim 1, wherein said controller controls the equipped vehicle to provide a smooth transition between two different set speeds based at least in part on the determined acceleration profile.

9. The driving assist system of claim 1, wherein said controller controls the equipped vehicle to provide a smooth transition between two different control modes based at least in part on the determined acceleration profile.

10. The driving assist system of claim 1, wherein the speed setting is selected by a driver of the equipped vehicle, and wherein the target speed is determined by the adaptive cruise control system at least in part responsive to determination of the presence of the lead vehicle ahead of the equipped vehicle.

11. The driving assist system of claim 1, wherein the determined acceleration profile comprises a single ramp acceleration profile.

12. The driving assist system of claim 1, wherein the determined acceleration profile comprises a double ramp acceleration profile.

13. A driving assist system for a vehicle, said driving assist system comprising:

an image sensor disposed at a vehicle equipped with said driving assist system and having a field of sensing exterior of the equipped vehicle and forward of the equipped vehicle;

a controller comprising a processor operable to process data sensed by said image sensor;

wherein said controller controls acceleration of the equipped vehicle at least in part in accordance with a speed setting of an adaptive cruise control system of the equipped vehicle;

wherein said controller receives, from a driver of the vehicle via a user input, a speed setting;

wherein said controller, responsive at least in part to processing by said processor of data captured by said image sensor, determines whether another vehicle is present that is travelling slower than the speed setting ahead of the equipped vehicle and in the same traffic lane traveled by the equipped vehicle;

wherein said controller, responsive to receiving the speed setting, determines an operating mode;

wherein, when the other vehicle is present, the determined operating mode is a distance mode;

wherein, when the other vehicle is not present, the determined operating mode is a speed mode;

wherein said controller determines a target speed, an acceleration profile and a speed profile based on the determined operating mode;

wherein each phase of the determined acceleration profile comprises a function represented by a curved profile, and wherein at least one of the phases of the determined acceleration profile comprises a function represented by a second order polynomial curve or higher;

wherein said controller adjusts the speed and the acceleration of the equipped vehicle based on the determined targeted speed, the determined acceleration profile and the determined speed profile; and wherein adjusting the acceleration of the equipped vehicle based on the determined acceleration profile comprises adjusting the acceleration of the equipped vehicle based on an output of the function of each respective phase of the determined acceleration profile.

14. The driving assist system of claim 13, wherein said controller operates in the speed mode to control the speed of the equipped vehicle in accordance with the speed setting when no relevant vehicle is in the path of travel of the equipped vehicle, and wherein, when the other vehicle is present, said controller operates in the distance mode to control the equipped vehicle to maintain a predetermined distance between the equipped vehicle and the other vehicle, and wherein said controller determines the acceleration profile to control the equipped vehicle to provide a smooth transition when said controller switches between the speed mode and the distance mode.

15. The driving assist system of claim 13, wherein said controller controls the equipped vehicle to provide a smooth transition between two different speed settings based at least in part on the determined acceleration profile.

16. The driving assist system of claim 13, wherein said controller controls the equipped vehicle to provide a smooth transition between two different control modes based at least in part on the determined acceleration profile.

17. The driving assist system of claim 13, wherein the controller, responsive to determining the acceleration profile, determines a feed-forward acceleration based on the acceleration profile and a transition acceleration, wherein the transition acceleration is based upon the determined operating mode.

18. The driving assist system of claim 13, wherein the determined acceleration profile comprises an entry phase, a main phase, and an exit phase, and wherein at least two selected from the group consisting of (i) the entry phase, (ii) the main phase and (iii) the exit phase comprise functions represented by different order polynomial curves polynomials.

19. A driving assist system for a vehicle, said driving assist system comprising:
- a radar sensor disposed at a vehicle equipped with said driving assist system and having a field of sensing exterior of the equipped vehicle and forward of the equipped vehicle;
- a controller comprising a processor operable to process data sensed by said radar sensor;
- wherein said controller controls acceleration of the equipped vehicle at least in part in accordance with a speed setting of an adaptive cruise control system of the equipped vehicle;
- wherein said controller receives, from a driver of the vehicle via a user input, a speed setting;
- wherein said controller, responsive at least in part to processing by said processor of data captured by said radar sensor, determines whether another vehicle is present that is travelling slower than the speed setting ahead of the equipped vehicle and in the same traffic lane traveled by the equipped vehicle;
- wherein said controller, responsive to receiving the speed setting, determines an operating mode;
- wherein, when the other vehicle is present, the determined operating mode is a distance mode;
- wherein, when the other vehicle is not present, the determined operating mode is a speed mode;
- wherein said controller determines a target speed, an acceleration profile and a speed profile based on the determined operating mode; and
- wherein said controller adjusts the speed and the acceleration of the equipped vehicle based on the determined target speed, the determined acceleration profile and the determined speed profile, and wherein each phase of the determined acceleration profile comprises a function represented by a different curved profile, wherein at least one of the phases of the determined acceleration profile comprises a function represented by a second order polynomial curve or higher, and wherein the phases, when combined, provide a non-linear transition to the determined target speed; and
- wherein adjusting the acceleration of the equipped vehicle based on the determined acceleration profile comprises adjusting the acceleration of the equipped vehicle based on an output of the function of each respective phase of the determined acceleration profile.

20. The driving assist system of claim 19, wherein said controller operates in the speed mode to control the speed of the equipped vehicle in accordance with the speed setting when no relevant vehicle is in the path of travel of the equipped vehicle, and wherein, when the other vehicle is present, said controller operates in the distance mode to control the equipped vehicle to maintain a predetermined distance between the equipped vehicle and the other vehicle, and wherein said controller determines the acceleration profile to control the equipped vehicle to provide a smooth transition when said controller switches between the speed mode and the distance mode.

21. The driving assist system of claim 19, wherein said controller controls the equipped vehicle to provide a smooth transition between two different speed settings based at least in part on the determined acceleration profile.

22. The driving assist system of claim 19, wherein said controller controls the equipped vehicle to provide a smooth transition between two different control modes based at least in part on the determined acceleration profile.

23. The driving assist system of claim 19, wherein the controller, responsive to determining the acceleration profile, determines a feed-forward acceleration based on the acceleration profile and a transition acceleration, wherein the transition acceleration is based upon the determined operating mode.

24. The driving assist system of claim 19, wherein the determined acceleration profile comprises an entry phase, a main phase, and an exit phase, and wherein at least two selected from the group consisting of (i) the entry phase, (ii) the main phase and (iii) the exit phase comprise functions represented by different order polynomial curves.

\* \* \* \* \*

UNITED STATES PATENT AND TRADEMARK OFFICE
CERTIFICATE OF CORRECTION

PATENT NO.         : 11,142,200 B2
APPLICATION NO.    : 15/903134
DATED              : October 12, 2021
INVENTOR(S)        : Christophe Albert Rene Laurent It is certified that error appears in the above-identified patent and that said Letters Patent is hereby corrected as shown below:

In the Specification

Column 4
Line 62, "(DO) and its derivative (DDO)" should be --(D0) and its derivative (DD0)--

Column 5
Line 17, "(DO)" should be --(D0)--

In the Claims

Column 11
Lines 14-15, Claim 18, "polynomial curves polynomials." should be --polynomial curves.--

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*